United States Patent [19]

Bertoli et al.

[11] Patent Number: 5,395,629
[45] Date of Patent: Mar. 7, 1995

[54] PREPARATION OF BUTTERFAT AND VEGETABLE BUTTER SUBSTITUTES

[75] Inventors: Constantin Bertoli, Romanel S Lausanne, Switzerland; Katalin Hosszu-Sackett, Los Angeles; Nicholas Melachouris, Westlake Village, both of Calif.; Helmut Traitler, Corseaux, Switzerland

[73] Assignee: Nestec S.A., Vevey, Switzerland

[21] Appl. No.: 975,413

[22] Filed: Nov. 12, 1992

[51] Int. Cl.⁶ .............................................. A23C 15/02
[52] U.S. Cl. ........................................ 426/35; 426/56; 426/603; 426/607; 435/134
[58] Field of Search .................... 426/804, 35, 56, 607, 426/603, 581; 435/134, 135, 174, 176–182

[56] References Cited

U.S. PATENT DOCUMENTS

| | | | |
|---|---|---|---|
| 2,726,158 | 12/1955 | Cochran | 426/607 |
| 2,783,151 | 2/1957 | Cochran | 426/607 |
| 3,353,964 | 11/1967 | Seiden | 426/607 |
| 3,396,037 | 8/1968 | Bell | 426/607 |
| 3,537,865 | 11/1970 | Daniels | 426/607 |
| 3,595,673 | 7/1971 | Sieden | 426/607 |
| 4,032,405 | 6/1977 | Tatsumi | 195/82 |
| 4,268,527 | 5/1981 | Matsuo | 426/33 |
| 4,268,534 | 5/1981 | Kawada | 426/607 |
| 4,275,081 | 6/1981 | Coleman | 426/35 |
| 4,308,350 | 12/1981 | Matsuo | 435/134 |
| 4,364,869 | 12/1982 | Muller | 260/410.9 R |
| 4,479,976 | 10/1984 | Lansbergen | 426/607 |
| 4,629,742 | 12/1986 | Brady | 210/500.42 |
| 4,678,580 | 7/1987 | Brady | 210/490 |
| 4,705,692 | 11/1987 | Tanaka | 426/607 |
| 4,839,192 | 6/1989 | Sagi | 426/607 |
| 4,839,287 | 6/1989 | Holmberg | 435/135 |
| 4,888,196 | 12/1989 | Ehrman | 426/607 |
| 5,061,498 | 10/1991 | Matsuzaki | 426/33 |
| 5,066,510 | 11/1991 | Ehrman | 426/804 |
| 5,089,404 | 2/1992 | Matsumoto | 435/134 |
| 5,219,744 | 6/1993 | Kurashige | 435/135 |
| 5,288,619 | 2/1994 | Brown | 426/33 |

FOREIGN PATENT DOCUMENTS 0322027  6/1989  European Pat. Off. .

Primary Examiner—Carolyn Paden
Attorney, Agent, or Firm—Vogt & O'Donnell

[57] ABSTRACT

Fat substitutes are prepared without a molecular distillation step by enzymatically or chemically interesterifying a fully hydrogenated vegetable oil rich in stearic acid (FHLCT) with a medium chain fatty acid triglyceride rich in caproic, caprylic and capric fatty acids (MCT) under conditions such that the amount of tristearin in the interesterified mixture is lower than 5% by weight. The interesterified mixture is bleached and deodorized, and may be used as a substitute for butterfat or vegetable butter, e.g., cocoa butter.

8 Claims, No Drawings

PREPARATION OF BUTTERFAT AND VEGETABLE BUTTER SUBSTITUTES

BACKGROUND OF THE INVENTION

The present invention concerns a process for the preparation of a butterfat or vegetable butter replacer.

There is a general interest to create fats with a nutritional claim of low in cholesterol and reduced calories which can replace butterfat in some applications, particularly in ice cream or cream and cheese sauces, yogurt, cookie mixes and shortenings. One problem with known fats of vegetable origin which could replace butterfat is their high content in unsaturated fatty acids which may be detrimental to flavour due to oxidative breakdown leading to degradation products. Partially hydrogenated vegetable fats are no valuable alternative since they contain high amounts of nutritionally objectionable trans-fatty acids.

There is also a general interest the create fats of vegetable origin with a nutritional claim of reduced calories that are able to replace cocoa butter and confectionery fats such as cocoa butter equivalents based on tropical fats, i.e., palm oil fractions, or partially hydrogenated vegetable fats. Tropical fats contain high amounts of lauric or myristic acid which are perceived as health risk-linked., whereas partially hydrogenated vegetable fats contain high amounts of objectionable trans-fatty acids as previously stated.

European Patent Application Publication No. 322,027 is concerned with low calorie fats which are poor in unsaturated fatty acids and contain predominantly triglycerides with one long chain saturated and two medium chain fatty acids. One starting material for their production is fully hydrogenated high erucic acid rapeseed oil, and they thus contain fatty acids having C20 and higher carbons, predominantly behenic acid. They have reduced calorie density, acceptable organoleptic properties and a characteristic crystallization behaviour. They are prepared by random rearrangement of triglycerides with three long chain saturated fatty acids, containing behenic acid, with medium chain triglycerides and subsequent molecular distillation.

SUMMARY OF THE INVENTION

The present invention provides a process for the preparation of a butterfat or vegetable butter replacer which comprises interesterifying a fully hydrogenated vegetable oil rich in stearic acid with a medium chain fatty acids triglyceride without a molecular distillation step and under such conditions that the amount of tristearin in the final interesterified fat is lower than 5% by weight, and deodorizing the interesterified fat.

The invention also provides butterfat substitutes and cocoa butter and confectionery fat substitutes obtained by the above processes.

The invention further provides reduced calorie food compositions comprising the butterfat or cocoa butter and confectionery fat substitutes obtained by the above processes.

DETAILED DESCRIPTION OF THE INVENTION

A suitable fully hydrogenated vegetable oil in the invention can be a vegetable oil chosen among sunflower, safflower, high oleic sunflower, high oleic safflower, soybean, maize, low or zero erucic acid rapeseed oil or vegetable olein fractions which have undergone full hydrogenation or fully hydrogenated *Pentaclethra macrophylla* oil or pure tristearine. It is preferably fully hydrogenated sunflower oil containing about 92% stearic acid and about 8% palmitic acid or fully hydrogenated soybean oil containing about 89% stearic acid and about 11% palmitic acid or a mixture of said vegetable fats.

A suitable starting medium chain fatty acid triglyceride (MCT) in the invention can be of natural or synthetic origin and is rich in caproic, caprylic or capric fatty acids and preferably contains mainly caprylic and capric fatty acids. It can be obtained, e.g., from coconut, palm kernel or babassu oils.

Interesterification in the invention can be carried out chemically or enzymatically starting from a mixture of 35–70% MCT and 30–65% fully hydrogenated triglycerides rich in stearic acid (hereinafter designated FHLCT) by weight, preferably 45–53% MCT and 47–55% FHLCT by weight and most preferably a mixture of about 50–53% MCT for 47–50% FHLCT by weight of these trigycerides.

In a first embodiment of the invention, a chemical rearrangement process is carried out. This results in randomly distributing the fatty acid residues amongst the triglyceride molecules with the aid of an interesterification catalyst such as, e.g., sodium methoxide in an amount of preferably 0.1 to 0.5% by weight and most preferably about 0.2% by weight of the starting fat mixture.

The reaction is carried out in a reaction vessel preferably at 80°–100° C. and most preferably at about 90° C. under sufficient stirring during 1–5 h and most preferably during about 2 h. During the stirring procedure, the mixture is kept under a vacuum of 5–100 mbar, preferably of about 25 mbar. At the end of the reaction, the whole mixture is washed several times with about 5–10% of water, and the soaps, which were formed during the reaction, are discarded. The fat phase is subsequently bleached with about 0.1% of a bleaching earth, e.g., TONSIL (R).

In a variant of the first embodiment, the starting fat mixture contains about equal parts of MCT and FHLCT by weight. After completion of the reaction the reaction mixture is then fractionated in order to separate unreacted tristearin. Fractionation takes place by working the mixture in a dry state under slow agitation, preferably at 37°–48° C. and most preferably at about 40° C., with inoculation with 0.05°–0.1% tristearin or FHLCT crystals by weight during 1–5 h and most preferably during about 2 h, after which ca. 10–15% by weight of a high melting fraction rich in tristearin is filtered off at the crystallization temperature over a filter press. The separated tristearin rich fraction can be recycled by being incorporated into the starting mixture of a further production batch.

In a second embodiment of the process of the invention, interesterification can be carried out enzymatically. Starting triglycerides are mixed in the desired ratio and heated to preferably 63°–75° C., most preferably to about 65° C. in a reaction vessel. The reaction is carried out without the addition of any solvent. To this mixture 1–10% and preferably, about 3% by weight of an immobilized enzyme of the lipase type, e.g., LIPOZYME IM 20 (R, Novo) or Lipozyme IM 60 (R, Novo) is added in the presence of 2–10% water by weight. The mixture is stirred for 5–24 h, preferably 7–15 h. At the end of the reaction, the mixture is filtered over a filter press, preferably at about 50° C., and the enzyme beads are recovered on the filter press. The enzyme can be used several times without being rehydrated. There is no change in its activity, although the enzyme looses water during each cycle and has a water content of slightly more than 1% after 4 cycles. At this water content, the enzyme has to be rehydrated to get its original activity. This can be done by spraying the amount of water needed onto the immobilized enzyme. After mixing, the enzyme is kept in a closed container for several h, e.g., about 4 h, to get a homogeneous distribution of the water within the support and the enzyme. The spraying and the equilibration can be done at room temperature. The amount of water to be added can be calculated from the given water content, e.g., 1%, and the value wanted, e.g., 10%. After rehydration, the enzyme can be used for several cycles.

In both embodiments of the process as stated above, the interesterified fat mixture or the filtrate from the filtration operation has to be bleached. In addition, the enzymatically interesterified fat should be neutralized for eliminating the remaining free fatty acids. Deodorization takes place at the end of the process.

In an embodiment of the deodorization step, at a temperature of at most 200° C., the filtrate is subjected to steam deodorization under a vacuum of preferably about 2.66 mbar, under a stream of about 0.4% by weight steam/h during about 2–3 h. The products so obtained are useful as butterfat replacers.

In an alternative embodiment of the deodorization step which is adapted to the production of cocoa butter or confectionery fat replacers, deodorization of the filtrate is carried out under higher temperature of at least 230° C. and preferably of about 240° C., the other parameters remaining the same as in the former embodiment. Under these latter conditions, 6–10% and preferably about 10% by weight of C6, C8 and C10 fatty acid triglycerides which have not reacted are stripped off. These latter triglycerides can be recycled at the beginning of the process.

In particular, ice cream, cream and cheese sauces, preferably for frozen foods, yogurt, cake and cookie mixes, candy and shortenings for baking can be obtained in accordance with the invention in which butterfat is replaced partially or totally by the fat obtained according to the above process. In ice cream, by way of example, the butterfat replacer employed at a level to replace partially, or totally, milk fat from cream gave substantial benefits in slightly lower caloric density, lower cholesterol, better flavour release, improved texture and stability and about the same heat-shock resistance in comparison to regular ice cream based on cream.

In chocolate, confectionery coating and confectionery filling masses the cacao butter or confectionery fat replacer had about the same functional properties as cocoa butter at a level to replace it partially or totally with a lower caloric density.

EXAMPLES

The following examples further illustrate the invention. Parts and percentages are by weight unless otherwise specified.

Example 1

31.8 kg C8,C10 medium chain fatty acids oil (MCT) were mixed with 28.2 kg fully hydrogenated soybean oil (FHSBO) in a reaction vessel and heated to 90° C. 300 g (about 0.5%) sodium methoxide were then added and the mixture was stirred at a medium speed for 2 h. During the stirring procedure, the whole mixture was kept under a vacuum of 25 mbar. At the end of the reaction, the mixture was washed 4 times with 6 kg water and the soaps were discarded. The fat phase was subsequently bleached with 0.06 kg TONSIL (R) by stirring at 85° C. for 20 min at 25 mbar. After separation of the bleaching earth, the fat was steam-deodorized at 200° C. under a vacuum of 2.66 mbar (2 mm Hg) with a steam stream of 0.24 kg steam/h during 2 h.

The resulting fat replacer was a bland, white and stable product with a melting range very similar to butterfat as ascertained by differential scanning calorimetry (DSC) and as a measure of its solid fat content by pulsed nuclear magnetic resonance (NMR). The DSC-generated thermal curves, at a scan rate of 5° C./min when heated from −20° to +60° C., showed a close match of melting profiles of butterfat. The butterfat replacer compared to the physical blend of the starting MCT/FHSBO showed an entirely different melting profile.

The composition and distribution of fatty acids on the glycerol backbone, quantitatively analysed by gas liquid chromatography, were as set forth in the following Table 1.

TABLE 1

| Triglycerides | Weight % | Mole % |
| --- | --- | --- |
| By type (M = medium chain, L = long chain) | | |
| MLM,MML,MLL,LML | 72.65 | 68.63 |
| MML,MLM | 44.55 | 44.99 |
| LLM,LML | 28.10 | 23.64 |
| MMM | 21.75 | 27.32 |
| LLL | 5.60 | 4.05 |
| | 100 | 100 |
| By fatty acids carbon number | | |
| C24: 8-8-8 | 4.20 | 5.67 |
| C26: 8-8-10 | 9.00 | 11.46 |
| C28: 8-10-10 | 6.80 | 8.20 |
| C30: 10-10-10 | 1.74 | 1.99 |
| C32: 8-8-16 | 1.93 | 2.10 |
| C34: 8-8-18/8-10-16 | 17.09 | 17.77 |
| C36: 8-10-18/10-10-16 | 19.56 | 19.44 |
| C38: 10-10-18 | 5.97 | 5.68 |
| C40: 8-16-16 | 0.44 | 0.40 |
| C42: 8-16-18/10-16-16 | 3.50 | 3.07 |
| C44: 8-18-18/10-16-18 | 15.52 | 13.12 |
| C46: 10-18-18 | 8.65 | 7.04 |
| C48: 16-16-16 | 0.25 | 0.20 |
| C50: 16-16-18 | 0.10 | 0.08 |
| C52: 16-18-18 | 1.46 | 1.08 |
| C54: 18-18-18 | 3.79 | 2.70 |
| | 100 | 100 |

As shown, the butterfat replacer has neither unsaturated nor trans fatty acids and is composed only of triglycerides of caprylic, capric (M), palmitic and stearic (L) acids with a predominance in monoM-diL and monoL-diM acids. The butterfat replacers had functionality and organoleptic properties similar to regular butterfat from cream but were free of cholesterol and had a better stability to oxidation and a caloric density about 25% lower.

Example 2

A mixture of equal parts of C8,C10 chain triglycerides and tristearin was treated with sodium methoxide as in Example 1. After completion of the reaction, the washed and bleached reaction mixture was dry-fractionated by being worked at 40° C. with inoculation of 0.05% tristearin or FHLCT crystals for 2 h under slow stirring and then filtered over a filter press at the same temperature. The high melting tristearin rich solid fraction separated amounted to 12% of the reaction mixture and was recycled for further production in the starting mixture of the following batch.

A subsequent deodorization of the filtrate under the conditions set forth in Example 1 gave a white butterfat replacer of functionality and organoleptic properties similar to regular butterfat from cream but free of cholesterol and with a better stability to oxidation and a caloric density of about 25% lower.

Example 3

A mixture of equal parts of C8,C10 chain triglycerides and tristearin was heated to 65° C. in a reaction vessel.

To this mixture, 3% of an immobilized enzyme of the lipase type, LIPOZYME IM 60 (Novo) in the presence of 10% water based on the enzyme was added. The mixture was stirred for 7 h. At the end of the reaction, the mixture was filtered over a filter press at 50° C. and the enzyme beads were recovered on the filter press. The filtrate was neutralized with caustic soda and subsequently bleached as in Example 1.

Deodorization of the neutralized and bleached filtrate was then subsequently carried out as in Example 1, which gave a white butterfat replacer of functionality and organoleptic properties similar to regular butterfat from cream but free of cholesterol and with a better stability to oxidation and a caloric density about 25% lower.

Example 4

The process of Example 2 was worked up to the deodorization step.

Deodorization was then subsequently carried out with steam at 240° C. under a vacuum of 2.66 mbar (2 mm Hg) with a steam stream of 0.4% steam/h during 2 h. Unreacted MCT were steam-stripped during deodorization and amounted to 10% of the filtrate subjected to deodorization. These MCT were recycled at the beginning of the process.

The fat thus obtained had a melting profile and functional properties similar to regular cocoa butter as ascertained by DSC, by solid fat content measurement and by incorporation into chocolate. It had a lower caloric density of about 25%. There was no demoulding problem in the production of chocolate tablets.

Example 5

The process of Example 3 was worked up to the deodorization step and the fat subsequently fractionated as described in Example 2. Deodorization of the fractionated fat was then carried out as in Example 4.

The fat thus obtained had a melting profile and functional properties similar to regular cocoa butter as ascertained by DSC, by solid fat content measurement and by incorporation into chocolate. It had a lower caloric density of about 25%. There was no demoulding problem in the production of chocolate tablets.

Example 6

Ice cream was prepared by blending the ingredients in the proportions mentioned in the following Table 2, pasteurizing, homogenizing, whipping and freezing them using standard ice cream processing.

TABLE 2

| Ingredient | Ice cream with replacer (%) | Standard ice cream (%) |
|---|---|---|
| Cream (40% fat) | — | 27 |
| Butterfat replacer | 27 | — |
| Milk solids non fat | 11 | 11 |
| Sucrose and polydextrose | 15 | 15 |
| Stabilizer | 0.4 | 0.4 |
| Water | 46.6 | 46.6 |

The product with butterfat replacer prepared according to the process of Example 1 was very similar in flavor, creaminess and melting properties to standard ice cream as tested by a test panel.

There were no difficulties in the preparation of the ice cream. Early heat shock-tests showed significant better behaviour of the product with butterfat replacer.

Example 7

Mustard cream sauce was prepared by mixing mustard with salt, pepper and lemon juice. The mixture was then gradually whisked in cream or butterfat replacer melt and diluted in hot water to make up the fat level found in regular cream. The compositions of the sauces were as indicated in the following Table 3.

TABLE 3

| Ingredient | Mustard sauce with replacer (%) | Standard Mustard sauce (%) |
|---|---|---|
| Cream (40% fat) | — | 72.3 |
| Butterfat replacer (made up with water to 40% fat) | 72.3 | — |
| Dijon mustard | 21.1 | 21.1 |
| Salt | 0.3 | 0.3 |
| Pepper | 0.3 | 0.3 |
| Lemon juice | 6 | 6 |

The sauce produced with the butterfat replacer prepared according to Example 1 was very similar in flavor, texture and emulsion stability to the regular cream product. As a difference, the thickness of the sauce increased with the use of the butterfat replacer.

Example 8

White sauce was produced by mixing flour and water, adding butter and cream or butterfat replacer and heating slowly under stirring until the sauce boiled. It was then removed from the heat and stirred in vinegar, the compositions of the sauces were as indicated in the following Table 4.

TABLE 4

| Ingredient | White sauce with replacer (%) | Standard white sauce (%) |
|---|---|---|
| Flour | 1.3 | 1.3 |
| Water | 12 | 12 |
| Butterfat | — | 12 |
| Butterfat replacer | 12 | — |
| Cream (40% fat) | — | 72.3 |
| Butterfat replacer (made up with water to 40% fat) | 72.3 | — |
| White wine vinegar | 2.4 | 2.4 |

The sauce produced with the butterfat replacer prepared according to Example 1 was very similar in flavor and emulsion stability to the regular cream product. As a difference, the thickness of the sauce increased with the use of the butterfat replacer.

Example 9

A sour cream of the composition indicated in the following Table 5 was produced by blending all the ingredients together except the butterfat replacer using a mixer. The blend was then heated to 55° C. and melted fat replacer produced as in Example 1 was added while mixing. The mixture was then homogenized under 172 bar and the homogenate pasteurized at 78° C. for 20 min. The mixture was finally cooled to 24° C., inoculated with an appropriate amount of lactic cultures and incubated at 24° C. to pH 4.6.

TABLE 5

| Ingredient | Composition (%) |
| --- | --- |
| Skim milk | 86.2 |
| Dairy solids non fat | 3.3 |
| Stabilizer | 1.9 |
| Butterfat replacer | 8.5 |

Example 10

Cottage cheese dressing of the composition indicated in the following Table 6 was produced by blending all the ingredients together except the butterfat replacer using a mixer. The blend was then heated to 55° C. and melted fat replacer produced as in Example 1 was added while mixing. The mixture was thus homogenized under 172 bar and the homogenate pasteurized at 74° C. for 30 min. The mixture was then rapidly cooled to 4° C.

TABLE 6

| Ingredient | Composition (%) |
| --- | --- |
| Skim milk | 84 |
| Dairy solids non fat | 2 |
| Stabilizer | 0.5 |
| Salt | 2 |
| Butterfat replacer | 11.6 |

Dry cottage cheese curd was finally creamed at 60% curd to 40% dressing ratio and refrigerated.

Example 11

A Yogurt of the composition indicated in the following Table 7 was produced by bringing skim milk to 55° C. and blending all the ingredients together except the butterfat replacer using a mixer. Melted fat replacer produced as in Example 1 was added while mixing. The mixture was thus homogenized under 172 bar and the homogenate pasteurized at 85° C. for 20 min. The mixture was then cooled to 41° C., an appropriate inoculum of lactic cultures was added and the mixture was finally incubated at 41° C. to pH 4.6.

TABLE 7

| Ingredient | Composition (%) |
| --- | --- |
| Skim milk | 95.7 |
| Dairy solids non fat | 1.75 |
| Stabilizer | 0.75 |
| Butterfat replacer | 1.8 |

We claim:

1. A process for preparing a butterfat or vegetable butter substitute composition without a molecular distillation step comprising:

preparing a mixture containing 30% to 65% by weight of a fully hydrogenated vegetable oil rich in stearic acid (FHLCT) and 35% to 70% by weight of a fatty acid triglyceride rich in fatty acids selected from the group consisting of caproic acid, caprylic acid and capric acid (MCT), and stirring the mixture with an immobilized lipase in the absence of solvent under conditions to obtain an interesterified mixture containing less than 5% by weight tristearin;

neutralizing the interesterified mixture;

bleaching the neutralized interesterified mixture; and deodorizing the bleached interesterified mixture.

2. A process according to claim 1 wherein 45% to 53% by weight MCT is interesterified with 47% to 55% by weight FHLCT.

3. A process according to claim 1 wherein 50% to 53% by weight MCT is interesterified with 47% to 50% by weight FHLCT.

4. A process according to claim 1 further comprising dry fractionating the bleached mixture prior to deodorization to separate unreacted tristearin from the mixture.

5. A process according to claim 4 wherein the bleached mixture is dry fractionated at a temperature of from 37° C. to 48° C.

6. A process according to claim 1 wherein the bleached interesterified mixture is steam deodorized at a temperature not exceeding 200° C.

7. A process according to claim 1 wherein the bleached interesterified mixture is steam deodorized at a temperature of at least 230° C.

8. A process according to claim 7 wherein the interesterified mixture is steam deodorized for a time sufficient to remove from 6% to 10% unreacted MCT from the mixture.

* * * * *